US006192142B1

(12) United States Patent
Pare, Jr. et al.

(10) Patent No.: US 6,192,142 B1
(45) Date of Patent: *Feb. 20, 2001

(54) TOKENLESS BIOMETRIC ELECTRONIC STORED VALUE TRANSACTIONS

(75) Inventors: David Ferrin Pare, Jr., Berkeley; Ned Hoffman, Sebastopol; Jonathan Alexander Lee, Oakland, all of CA (US)

(73) Assignee: Smarttouch, Inc., Berkeley, CA (US)

( * ) Notice: Under 35 U.S.C. 154(b), the term of this patent shall be extended for 0 days.

This patent is subject to a terminal disclaimer.

(21) Appl. No.: 09/243,208

(22) Filed: Feb. 2, 1999

Related U.S. Application Data

(63) Continuation of application No. 08/705,399, filed on Aug. 29, 1996, now Pat. No. 5,870,723, which is a continuation-in-part of application No. 08/442,895, filed on May 17, 1995, now Pat. No. 5,613,012, which is a continuation-in-part of application No. 08/345,523, filed on Nov. 28, 1994, now Pat. No. 5,615,277.

(51) Int. Cl.$^7$ .................................................. G06K 9/00
(52) U.S. Cl. ........................................ 382/115; 382/116
(58) Field of Search ................................. 382/115, 116, 382/117, 118, 119; 364/408; 340/853.2, 853.8; 235/375, 376, 379, 380, 382.5, 382, 381; 902/12, 13, 22, 23, 24

(56) References Cited

U.S. PATENT DOCUMENTS

| | | | |
|---|---|---|---|
| 4,961,142 | * 10/1990 | Elliott et al. | 364/408 |
| 5,036,461 | * 7/1991 | Elliott et al. | 364/408 |
| 5,613,012 | * 3/1997 | Hoffman et al. | 382/115 |
| 5,615,277 | * 3/1997 | Hoffman | 382/115 |
| 5,850,442 | * 12/1998 | Muftic | 380/21 |
| 5,892,838 | * 4/1999 | Brady | 382/115 |

* cited by examiner

Primary Examiner—Bijan Tadayon
Assistant Examiner—Sayed H. Azarian
(74) Attorney, Agent, or Firm—Marger Johnson & McCollom, P.C.

(57) ABSTRACT

The invention provides a method and device for tokenless authorization of a stored value transaction between a payor and a payee using an electronic identicator and at least one payor bid biometric sample, said method comprising the steps of registering with the electronic identicator at least one payor registration biometric sample, and at least one payor stored value account. During a payee registration step, the payee registers a payee identification data with the electronic identicator. In a transaction formation step, an electronic financial transaction is formed between the payor and the payee, which includes payee bid identification data, a transaction amount, and at least one payor bid biometric sample. The bid biometric sample is obtained from the payor's person. In at least one transmission step, the payee bid identification data, the transaction amount, and payor bid biometric sample are electronically forwarded to the electronic identicator. Payor identification occurs when the electronic identicator compares the bid biometric sample with at least one registered biometric sample for producing either a successful or failed identification of the payor. Furthermore, the electronic identicator compares the payee's bid identification data with a payee's registered identification data for producing either a successful or failed identification of the payee. Upon successful identification of the payor and payee, a stored value transaction is authorized without the payor presenting any man-made tokens such as a stored value card, smartcards, or magnetic swipe cards to debit the payor stored value account.

19 Claims, 7 Drawing Sheets

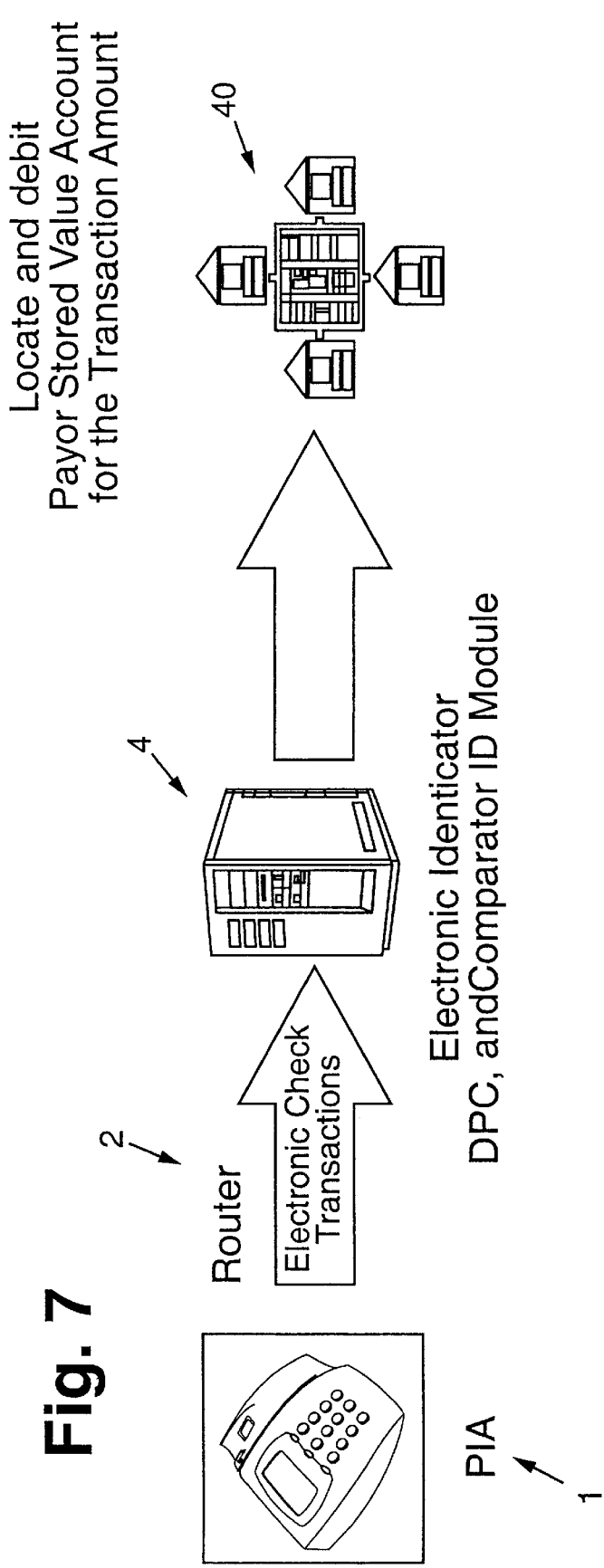

TOKENLESS BIOMETRIC ELECTRONIC STORED VALUE TRANSACTIONS

CROSS REFERENCE

This application is a continuation of application Ser. No. 08/705,399, filed on Aug. 29, 1996 now U.S. Pat. No. 5,870,723, which is a continuation-in-part of U.S. application Ser. No. 08/442,895 filed on May 17, 1995 now U.S. Pat. No. 5,613,012 which is a continuation-in-part of U.S. application Ser. No. 08/345,523, filed on Nov. 28, 1994, now U.S. Pat. No. 5,615,277.

FIELD OF THE INVENTION

This invention relates to the field of tokenless biometric electronic financial transactions. Specifically, this invention is directed towards a system and method of using biometrics for processing stored value financial transactions without requiring the user to directly use or possess any man-made tokens. For any transaction designated to be processed as an electronic stored value, this invention provides a user, whether an individual or a business, with the ability to pay for goods and services either at the retail point of sale or over the internet using only a biometric.

BACKGROUND

Traditionally, a person must directly possess a man-made token whenever attempting authorization for an electronic stored value transaction. By contrast, as the disclosed invention is completely tokenless, it does not require the user to directly possess, carry or remember any token that can be lost, stolen or damaged.

A particular example of such man-made tokens is pre-encoded stored value stored value tokens that are popular in financial transactions. Whether magnetic swipe cards or smart cards are used, in stored value transactions the payor has actually withdrawn funds from his own financial account for pre-payment purposes and these funds can thereafter be accessed via any one of several types of tokens. Examples of such tokens include: a) a magnetic stripe encoded with either a bank or other third party's account for an on-line authorization, or; b) a memory chip embedded within the physical token itself for an off-line authorization; c) a magnetic stripe encoded with the payee's financial account data for an on-line authorization.

In the case of third party online authorization, the stored value token draws on funds that the payor has transferred into a third party account for settlement with the payee at a later date.

In the case of an off-line authorization, funds are transferred by the payor from his financial account onto a stored value token, such as a magnetic swipe card or a smart card using an embedded memory chip. In this context, "off-line" means that the transaction is processed through a chip on the card and there is no processing involving dial-up access to a financial account.

In the case of a payee on-line authorization, the payor transfers pre-payment directly to a payee's financial account and is issued a magnetic encoded token that is identifies the stored value account. An example is a magnetic swipe card that is encoded with the payor's specified pre-paid amount and which can be used at a specific retailer or in a specific geographic region, such as a metropolitan subway system. In these instances, the payor's funds are in effect transferred to a specific payee's financial account and are reserved for later use by the payor, while the payee earns interest on the cash reserve. Unlike cash, when such a stored value token is stolen the funds may be stolen from the payor but they are still in a stored value account at the card-issuing payee.

Therefore, whether buying services or products, a payor must rely on the money transfer to be enabled by the payor using man-made memory tokens. The sole functions of such tokens are to store money. However, these tokens can be easily exchanged, either knowingly or unknowingly, between people, thereby de-coupling them from the original intended person.

Various token-based biometric technologies have been suggested in the prior art, using smart cards, magnetic swipe cards, in conjunction with fingerprints, hand prints, voice prints, retinal images, facial scans or handwriting samples. However, because the biometrics are generally either: a) stored in electronic and reproducible form on the token itself, whereby a significant risk of fraud still exists because the comparison and verification process is not isolated from the hardware and software directly used by the payor attempting access, or; b) used in tandem with the user directly using magnetic swipe cards, paper checks or a PC with the user's financial data stored resident therein. Examples of this approach to system security are described in U.S. Pat. No. 4,821,118 to Lafreniere; U.S. Pat. No. 4,993,068 to Piosenka et al.; U.S. Pat. No. 4,995,086 to Lilley et al.; U.S. Pat. No. 5,054,089 to Uchida et al.; U.S. Pat. No. 5,095,194 to Barbanell; U.S. Pat. No. 5,109,427 to Yang; U.S. Pat. No. 5,109,428 to Igaki et al.; U.S. Pat. No. 5,144,680 to Kobayashi et al.; U.S. Pat. No. 5,146,102 to Higuchi et al.; U.S. Pat. No. 5,180,901 to Hiramatsu; U.S. Pat. No. 5,210,588 to Lee; U.S. Pat. No. 5,210,797 to Usui et al.; U.S. Pat. No. 5,222,152 to Fishbine et al.; U.S. Pat. No. 5,230,025 to Fishbine et al.; U.S. Pat. No. 5,241,606 to Horie; U.S. Pat. No. 5,265,162 to Bush et al.; U.S. Pat. No. 5,321,242 to Heath, Jr.; U.S. Pat. No. 5,325,442 to Knapp; U.S. Pat. No. 5,351,303 to Willmore; U.S. Pat. No. 5,832,464 to Houvener et al, all of which are incorporated herein by reference.

Uniformly, the above patents disclose financial systems that require the user's presentation of tokens to authorize each transaction, thereby teaching away from tokenless biometric financial transactions.

As a result, there is a need for a new electronic stored value transactions system that is practical, convenient for the consumer, and yet cost-effective to deploy. More specifically, there is a need for an electronic stored value financial transaction system that: a) can rely solely on a user's biometric for transaction authorization, and; b) does not require the payor to directly possess any man-made memory tokens such as smart cards, magnetic swipe cards or personal computers.

Lastly, such a system must be affordable and flexible enough to be operatively compatible with existing networks having a variety of electronic transaction devices and system configurations.

Accordingly, it is the objective of the present invention to provide a new system and method of tokenless biometric financial transactions for electronic stored value.

As such, it is an objective of the invention to provide an electronic stored value financial transaction system and method that eliminates the need for a payor to directly possess any man-made token. Further, it is an objective of the invention to provide an electronic stored value transaction system that is capable of verifying a user's identity based on one or more unique characteristics physically personal to the user, as opposed to verifying mere possession of objects and information.

Another objective of the invention is to provide an electronic stored value transaction system that is practical, convenient, and easy to use, where payors no longer need to remember personal identification numbers to make purchases.

Another objective of the invention is to provide increased security in a very cost-effective manner, by completely eliminating the need for the payor to directly use ever more complicated and expensive tokens.

Another objective of the invention is to authenticate the system to the payor once the electronic stored value transaction is complete, so the payor can detect any attempt by criminals to steal their authentication information.

Another objective of the invention is that the payee be identified by an electronic identicator, wherein the payee's identification is verified.

Another objective of the invention is to be added in a simple and cost-effective manner to existing terminals currently installed at points of sale and used over the Internet around the world.

Yet another objective of the invention is to be efficiently and effectively operative with existing financial transactions systems and protocols, specifically as these systems and protocols pertain to processing of electronic stored value.

SUMMARY

The invention satisfies these needs by providing a method and device for tokenless authorization of a stored value transaction between a payor and a payee using an electronic identicator and at least one payor bid biometric sample, said method comprising the steps of registering with the electronic identicator at least one payor registration biometric sample, and at least one payor stored value account. During a payee registration step, the payee registers a payee identification data with the electronic identicator. In a transaction formation step, an electronic financial transaction is formed between the payor and the payee, which includes payee bid identification data, a transaction amount, and at least one payor bid biometric sample. The bid biometric sample is obtained from the payor's person. In at least one transmission step, the payee bid identification data, the transaction amount, and payor bid biometric sample are electronically forwarded to the electronic identicator. Payor identification occurs when the electronic identicator compares the bid biometric sample with at least one registered biometric sample for producing either a successful or failed identification of the payor. Furthermore, the electronic identicator compares the payee's bid identification data with a payee's registered identification data for producing either a successful or failed identification of the payee. Upon successful identification of the payor and payee, a stored value transaction is authorized without the payor presenting any manmade tokens such as a stored value card, smartcards, or magnetic swipe cards to debit the payor stored value account.

The payee identification data comprises any one of the following; a payee hardware ID code, a payee telephone number, a payee email address, a payee digital certificate code, a payee account index, a payee financial account number.

Preferably, in a payor deposit step, the payor deposits cash into the payor stored value account, and the payor stored value account is credited by the amount of the deposit.

Additionally, during payor registration, the payor registers a payor personal identification number with the electronic identicator, which is used by the tokenless authorization system to identify the payor.

Preferably, during a payor resource determination step, it is determined if the payor's stored value account has sufficient resources to be debited for the transaction amount. Regardless of a resource determination step, in a transaction payment step, the transaction amount is debited from a payor's stored value account.

The stored value transaction authorization device for debiting funds from a payor stored value account, includes the following components. A computer data processing center which has data bases for holding a registration biometric sample of the payor and registration payee identification data. It also has a party identification apparatus having a biometric sensor for input of a biometric sample. Communication lines provide for transmission of a registration and bid biometric sample obtained by the party identification apparatus from the payor's person to the data processing center. A comparator engine compares a bid biometric sample to at least one registration biometric sample, and also compares bid payee identification data with at least one registration payee identification data. Finally, an execution module authorizes debit of a transaction amount from the payor stored value account upon successful identification of the payor, wherein no man made memory devices such as a stored value card, smartcard, or a stored value card is used by the payor to authorize the debit of the stored value account. The authorization device of claim 13 wherein the payor registration biometric sample is associated with a PIN, the PIN used by the authorization device for identification the payor.

The present invention is significantly advantageous over the prior art in a number of ways. First, it is extremely easy and efficient for people to use because it eliminates the need to possess any tokens in order to execute stored value transactions. The present invention eliminates all the inconveniences associated with carrying, safeguarding, and locating such tokens, thereby significantly reduces the amount of diligence increasingly required. The payor is now uniquely empowered, by means of this invention, to conveniently conduct his personal and/or professional electronic transactions at any time without dependence upon tokens which may be stolen, lost or damaged.

The invention is clearly advantageous from a convenience standpoint to payees and financial institutions by making electronic stored value transaction purchases and other financial transactions less cumbersome and more spontaneous.

Overall, because the method and system of this invention is designed to provide a person with simultaneous direct access to all of his stored value accounts, the need for transactions involving stored value cards and the like will be greatly reduced. This will reduce the cost of equipment and staff required to collect, account, and process such transactions. Even the traditional requirement for internet electronic transactions of the payor needing to directly possess and use the ultimate token, a personal computer with resident payor-identification data, will be eliminated.

Moreover, the invention is markedly advantageous and superior to existing systems in being highly fraud resistant. Since the present invention determines identity and transaction authorization solely from an analysis of a user's unique biometric characteristics, this invention creates a highly secure system that maintains optimal convenience for both payors and payees to transaction their electronic business anytime, anywhere.

These and other advantages of the invention will become more fully apparent when the following detailed description of the invention is read in conjunction with the accompanying drawings.

BRIEF DESCRIPTION OF THE DRAWINGS

FIG. 7 is a diagram of the shows the overall preferred embodiment of the tokenless system for locating and debiting a payor's stored value account.

DETAILED DESCRIPTION

The invention provides a cardless biometric method for authorizing electronic payments using stored value accounts either at the retail point of sale or over the Internet. It is the essence of this invention that the payor not be required to directly use any man-made token in order to effect the transaction. A computer system, also known as an electronic identicator, is used to accomplish these goals.

A stored value account is defined as an account that contains funds deposited by a payor, and managed by the payee.

The tokenless authorization system comprises the following components:

Party Identification Apparatus (PIA)

Communication lines

Data Processing Center (DPC)

These components together allow a payor to originate a stored value payment without requiring the payor to use stored value cards, or other physical objects for purchases made using the stored value account.

Party Identification Apparatus (PIA)

Figure 1:
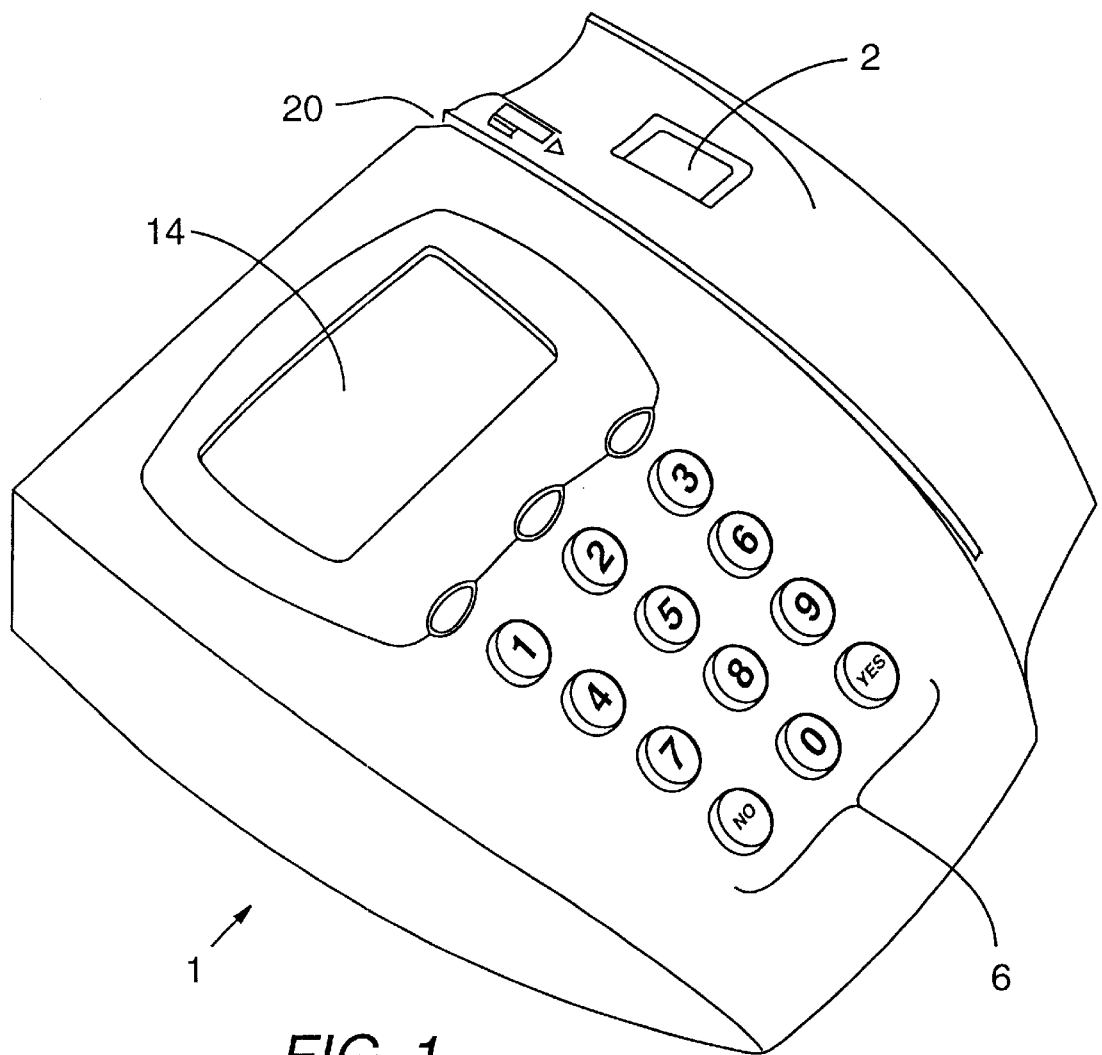
FIG. 1 shows the preferred embodiment of a Party Identification Device (PIA) with a biometric sensor and key pad.

The PIA is a device that gathers identity information for use in authorizing stored value payments. Each PIA conducts one or more of the following operations:

gather biometric input from a payor or payee gather a PIN code or password from a payor or payee secure communication between PIA and DPC using encryption secure storage of secret encryption keys store and retrieve a unique payee PIA hardware identification code secure enclosure & components from unauthorized tampering display information, allow parties to approve or cancel a stored value payment store, verify, and retrieve a payee digital identification code allow parties to select among choices of payor and payee accounts A preferred embodiment containing these components is shown in FIG. 1.

Biometric input is gathered using a biometric sensor 2 located within the PIA 1. Biometric sensor 2 is a finger image sensor, however it is understood that other types of biometric sensors such as iris scan and others are also used.

For PIAs requiring a fingerprint sensor, the PIA has a biometric fraud detection mechanism 4 that will assure that any biometric input gathered from the biometric sensor is from a real physical person, instead of a copy or replica. Preferably for the finger image sensor, this is a blood flow detector.

For systems employing a PIN, PIN input is preferably gathered using a keypad or PIN pad 6 that is also located securely inside the PIA.

Communication security is provided by encryption using unique secret keys known only to that specific PIA and the DPC, and the DES encryption algorithm, preferably triple-encrypted. Triple encryption means successive encrypt/decrypt/encrypt operations using two distinct 56-bit DES keys. This provides significantly higher security than a single encryption operation with one 56-bit DES key. Alternately, a public/private key system may also be used to encrypt information that passes between PIA and DPC. Both DES and public key encryption is well known in the industry.

The PIA also has secure memory 8 that can store and retrieve the unique secret encryption keys used to enable secure communications with the DPC. In this embodiment, this is battery backed-up RAM that is set up to be erased whenever the tamper-detect circuitry reports that tampering has been detected.

To use encryption keys, a key management system must be employed to assure that both sender and receiver are using the same key. When using DES, a preferred key management system is DUKPT, which is well known in the industry. DUKPT is designed to provide a different DES key for each transaction, without leaving behind the trace of the initial secret key. The implications of this are that even successful capture and dissection of a PIA will not reveal messages that have previously been sent, a very important goal when the effective lifetime of the information transmitted is years. DUKPT is fully specified in ANSI X9.24. The DUKPT key table is stored in the secure memory.

Each PIA preferably has a hardware identification code that is registered with the DPC at the time of manufacture. This makes the PIA uniquely identifiable to the DPC in all transmissions from that device. This hardware identification code is stored in write-once memory 10.

PIA physical security is assured by standard mechanisms. Preferably, these comprise tamper-detect circuitry 12, an enclosure that cannot be easily opened without visibly injuring the enclosure, erasable memory for critical secrets such as encryption keys, write-once memory for hardware identification, tight integration of all components, and "potting" of exposed circuitry.

Information such as the amount of a transaction, the identity of a payee, or other transaction-related information is displayed using an integrated LCD screen 14. It is preferable that the LCD screen be connected securely to the other components in the PIA to maintain security.

Approval or cancellation of a stored value payment is done using the PIA keypad.

Optionally, the PIA also validates public key digital certificates. In one embodiment, public keys of a particular certifying authority are initially stored in the PIA at the time of construction. This provides the mechanism to verify a payee's digital certificates that are signed by the certifying authority.

Although a preferred embodiment is described above, there are many different variations on specific PIA implementations. Fundamentally any device that is secure, can identify a person or entity with a high degree of certainty, and can connect to the DPC via some form of communication line can serve as a PIA.

In some embodiments, specifically the home use and public use instances, the PIA hardware identification code is not used to identify either the payor or the payee.

Communication Lines

Communications between the PIA and the DPC occur via many different communication methods. Most depend on the particular communication networks already deployed by the organization or retailer that deploys the transaction authorization system.

Figure 2:
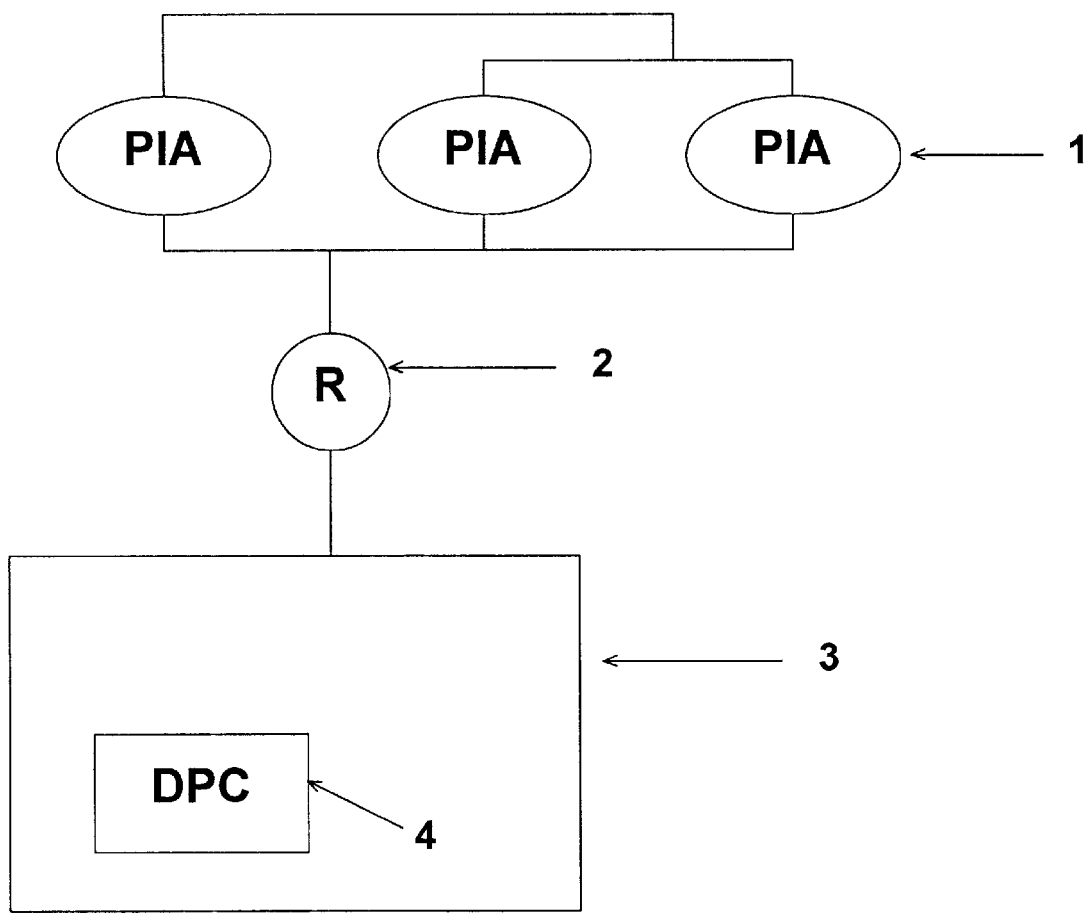
FIG. 2 shows the connection between the PIAs to a local router and a network operations center.

In an embodiment shown in FIG. 2, the PIAs 1 are connected via Ethernet to a local router 2, which is itself connected to a network operations center (NOC) 3 via frame relay lines. At least one DPC 4 is located at the NOC. Messages are sent from PIA to the DPC using TCP/IP over this network.

Figure 3:
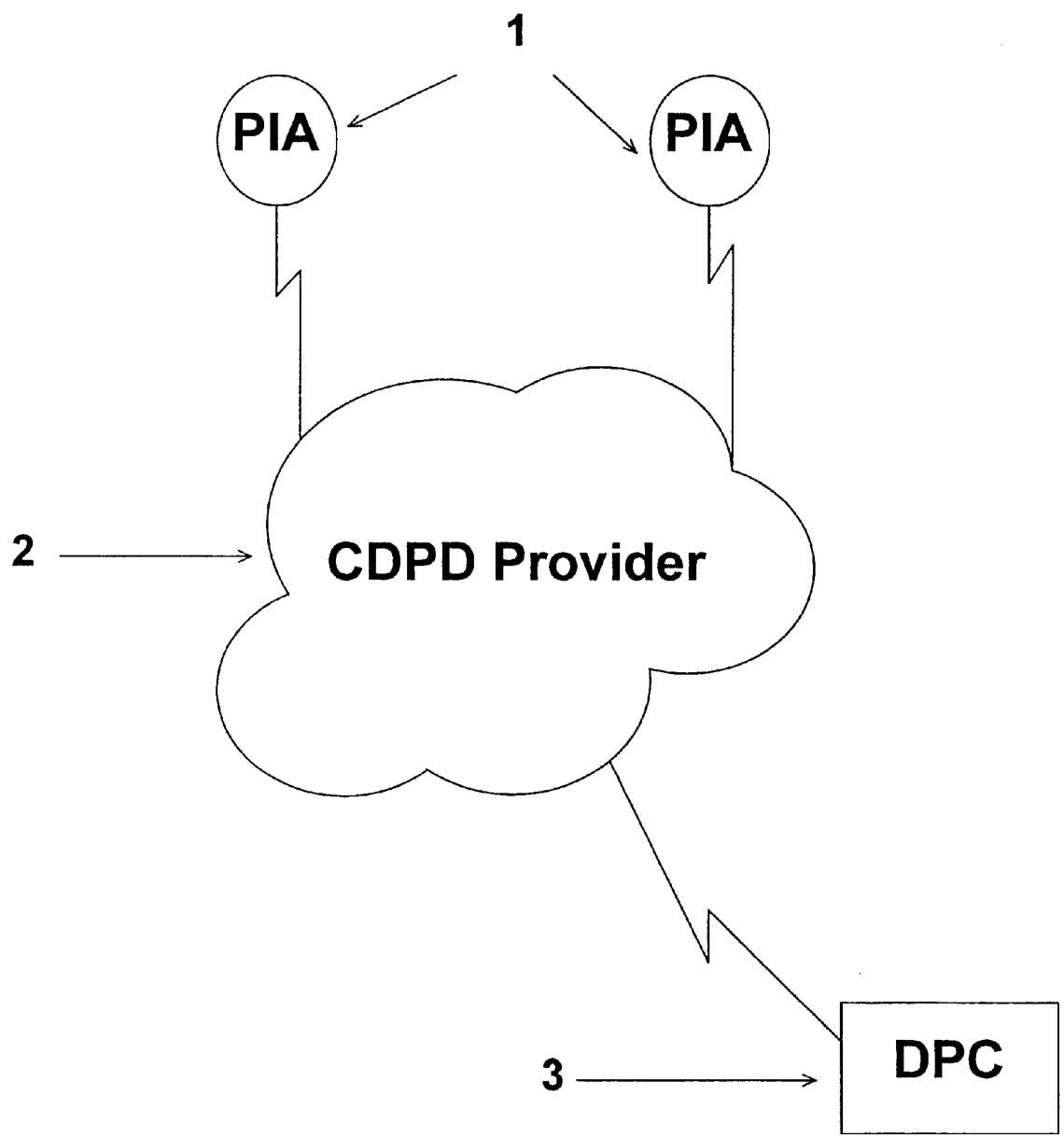
FIG. 3 shows an embodiment where the PIAs are connected to the DPC using a cellular digital packet data.

In another embodiment shown in FIG. 3, the PIAs 1 are connected via a cellular digital packet data (CDPD) modem to a CDPD provider 2, who provides TCP/IP connectivity from the PIA to an intranet to which at least one DPC 3 is attached.

In yet another embodiment, a PIA is connected via the Internet, as is at least one DPC. TCP/IP is used to transmit messages from PIA to DPC. There are many different ways to connect PIA to DPC that are well understood in the art.

Data Processing Center

Data Processing Centers (DPC) serve to identify the payor and the payee in a transaction, retrieve stored value and financial account information for identified parties, and perform the execution that will result in settlement of transactions and funds delivery for the stored value payment.

Figure 4:
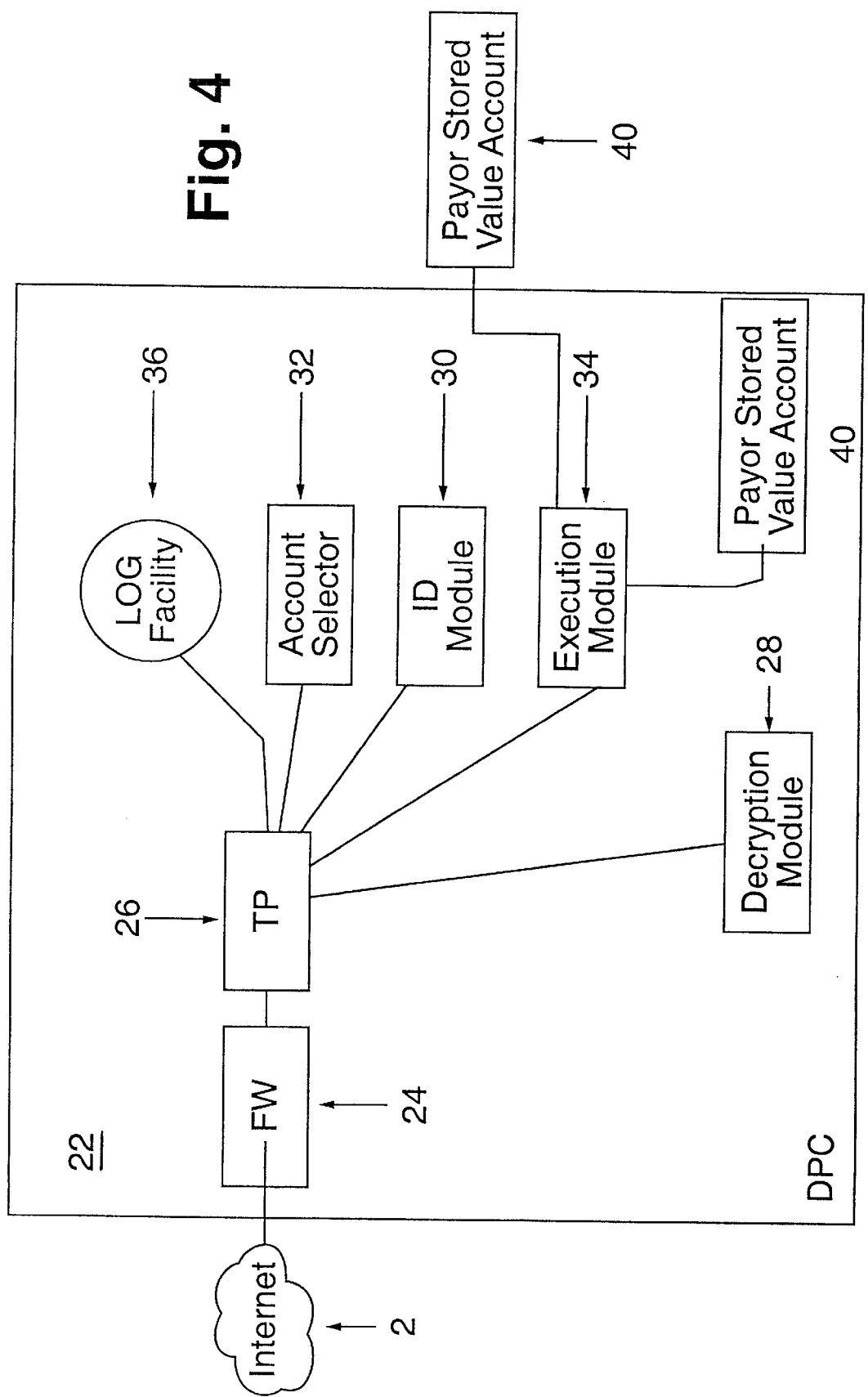
FIG. 4 is a preferred embodiment of the Data Processing Center (DPC) showing the connections between its components.

As seen in FIG. 4, the DPC 22 is connected to the Internet or intranet 2 using a firewall machine 24 that filters out all messages that are not from legitimate PIA devices. Messages are then sent to a transaction processor (TP) 26, which is responsible for overseeing the steps required to process the entire transaction.

In a preferred embodiment, the messages are decrypted. For this, the transaction processor uses the decryption module (DM) 28, which utilizes the hardware identification code of the PIA to identify the encryption codes that is required to decrypt the message from the PIA.

Once decrypted, the identity of both parties to the transaction is determined using the identification module (IM) 30. Once identified, the TP 26 determines the stored value account the payor will use using the account selector (AS) 32.

Once the financial account of the payor for the transaction is selected, the stored value payment is executed using the execution module (EM) 34. The EM obtains a transaction number from the payee, who debits the available balance in the payor's stored value account (SV) 40. If the payor's account has less funds than the transaction amount, the transaction is denied. Each transaction (successful or not) is logged in the logging facility (LF) 36.

In a preferred embodiment, more than one DPC provides fault tolerance from either natural or man-made disasters. In this embodiment, each DPC uses a backup power generator, redundant hardware, mirrored databases, and other standard fault tolerant equipment known in the industry.

Decryption Module (DM)

In a preferred embodiment, all messages the DPC receives, with the exception of those not constructed by a PIA, contain a PIA hardware identification code, a sequence number, and a Message Authentication Code (MAC). (Message authentication codes, also known as cryptographic checksums, well known in the transaction industry, are used to assure that any changes to the content of the message will be detectable by the entity receiving the transmission.). The DM validates the message's MAC and then checks the sequence number for that particular PIA. If the DM determines that both the MAC and the sequence number are valid, the DM uses the unique secret key for that particular PIA to decrypt the message. For the decryption to function properly, the DM must contain a copy of each PIA's DUKPT key table.

If the decryption operation fails, or if the MAC check fails, the message is considered an invalid message. The TP logs a warning to the LF, terminates processing for the message, and returns an error message to the originating PIA.

Each message TP 26 receives preferably contains a response key stored in the encrypted section of the message. Before the TP replies to a message that includes a response key, it instructs the DM to encrypt the response message with that response key. The DM also generates a MAC for the response and appends it to the message.

Preferably, error messages are not encrypted although the DM does include a MAC for message authentication. Such messages never include confidential information. However, most response messages include a status or response codes that can indicate whether the request succeeded or not. For example, when the EM declines a transaction for financial reasons, it does not return an error message, it returns a normal transaction response message with a response code set to "failed".

Identification Module (IM)

Party identification occurs in different ways, depending on the identification information that is provided by the PIA. The identification module has subsystems for each type of information that is provided, and each subsystem is highly optimized to provide rapid identification as outlined below.

In a preferred embodiment, identification module 30 comprises subsystems that can identify parties from the following information:

biometric data and PIN
  biometric data alone
  digital identification (digital certificates)
  PIA hardware identification code Biometric-PIN Identification Subsystem (BPID)

In a preferred embodiment, the BPID subsystem comprises at least two BPID processors, each of which is capable of identifying parties from their biometric and PIN codes.

Preferably, the database of parties identifiable from biometric-PIN combinations is distributed equally across all BPID processors. Each processor is then responsible for a subset of identifications.

Figure 5:
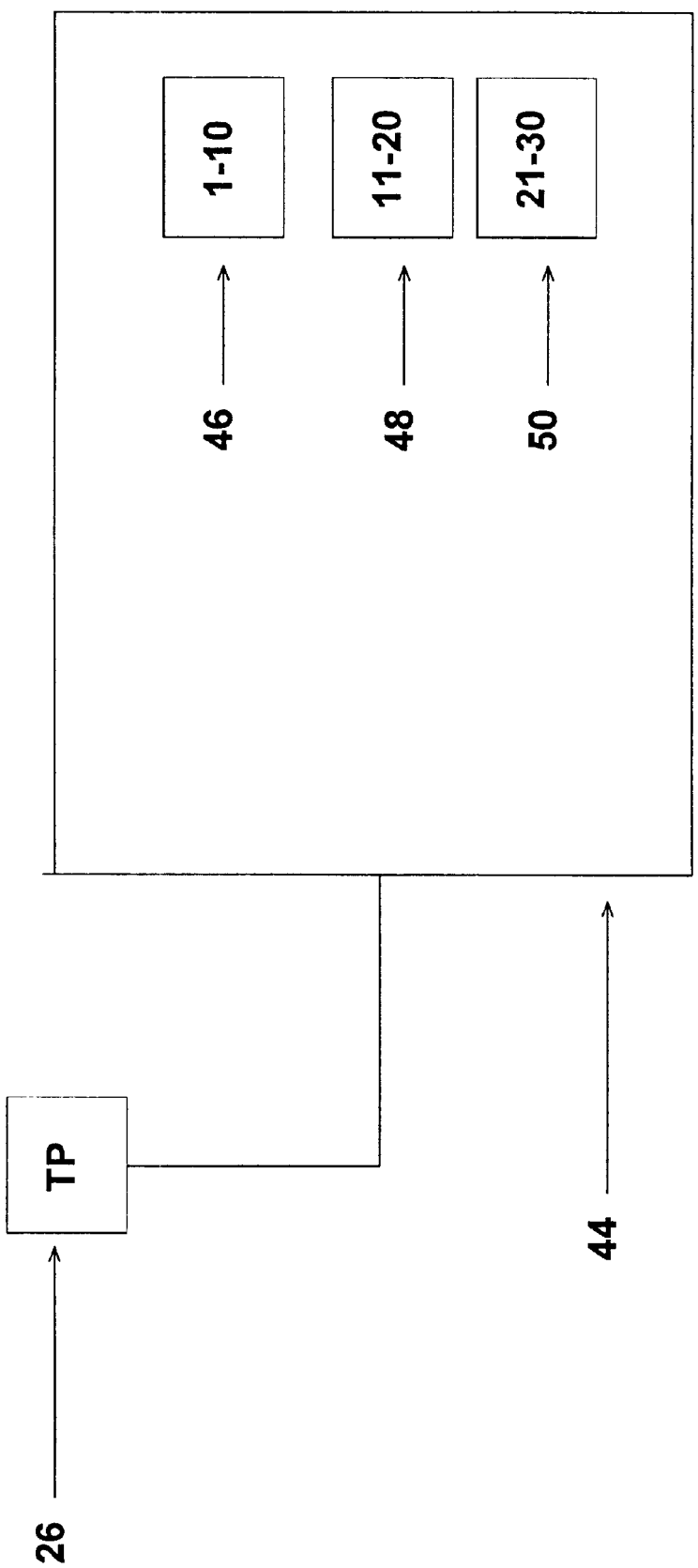
FIG. 5 shows a method by which the transaction processor determines a Biometric-PIN from the Biometric-PIN Identification subsystem is responsible for a given subdivision of the biometric database.

In FIG. 5, TP 26 determines which Biometric-PIN from the BPID subsystem 44 is responsible for a given subdivision of the biometric database. In one embodiment, one BPID 46 is responsible for identifying people with PINs 1–10, another BPID 48 is responsible for identifying PINs 11–20, and a third BPID 50 is responsible for identifying PINs 21–30. For example, all messages from the PIA containing a PIN that equals the number 30 would be routed to BPID 50 for identification of the payor.

Once a BPID processor receives a bid biometric sample and PIN for identification, the processor searches through its database, retrieving all registered biometric samples that match or correspond to that particular bid PIN. Once all corresponding registered biometric samples are retrieved, the processor compares the bid biometric from the message to all retrieved registered biometric samples. If a match is found, the processor transmits the identity of the party back to TP 26. If no match is found, the processor transmits a "party not identified" message back to TP 26.

Biometric Identification Subsystem (BID)

In another embodiment, the BID subsystem comprises at least two BID processors, each of which is capable of identifying parties only from their biometric sample.

In one embodiment, each BID processor contains the entire database of biometrics. To distribute the transactions evenly across processors without undue effort, the TP determines randomly which BID processor will be used for a given stored value payment, and delegates the identification request to that BID processor. That BID processor then performs a search of its biometric sample database in order to find a matching registered biometric sample.

In one embodiment, other information is present that assists the BID processor in searching the database. For finger images, this includes information such as the classification of the image (whirl, arch, etc.), and other information about the finger ridge structure that is useful for selecting out biometrics that are not likely to match (or information on biometrics that are likely to match).

Biometric comparisons are often more accurate if multiple biometrics are used. In some embodiments, multiple biometrics are used to more rapidly and more accurately identify individuals.

Digital Identification Subsystem

In a preferred embodiment, the digital identification subsystem comprises multiple processors, each of which is capable of identifying a payee from their digital certificates. In this embodiment, digital certificates are used to perform digital identification of the payee. Preferably this includes corporate website addresses and certifying authorities only. Where possible, people provide biometrics as a means of identification, while computers provide digital certificates.

A digital certificate uniquely identifies a party. The major difficulty is verifying that a particular digital certificate is valid. This requires a public key from the certifying authority that issued that particular digital certificate. This requires that the digital identification subsystem have a list of certifying authorities and the public keys used to validate the digital certificates they issue. This table must be secure, and the keys stored therein must be kept up to date. These processes and others relating to the actual process for validating digital certificates are well understood in the industry.

PIA Hardware Identification Subsystem (PHI)

In a preferred embodiment, PIA hardware identification codes are translated into payee identification by the PHI subsystem. This subsystem maintains a list of all PIAs ever manufactured. Preferably, when a particular payee purchases a PIA, that payee's identity is linked to that PIA. Any transactions that originate from that PIA is assumed to be destined for the party that purchased the PIA.

In one embodiment, there are many financial accounts linked to a particular payee, while there is only one financial account linked to transactions issuing from a particular PIA. In another embodiment, the PIA hardware identification code does not serve to identify either the payee or the payor. This is the case in PIAs purchased for public terminals, Automated Teller Machines, or for home use.

Account Selector Subsystem (AS)

In the preferred embodiment, there is one payor stored value account associated with a particular payee. The AS automatically selects a payor's stored value account based on the identity of the payee.

Execution Module (EM)

In a preferred embodiment, the execution module 34 generates a message to a payee to cause the transaction to take place.

The EM transmits the payor stored value account number, the transaction amount, and the payee transaction data to the payee, who then either approves or denies the transaction.

If the payee approves the transaction, it returns a transaction number to the EM, and immediately debits the payor's debit account. The transaction number is returned to the PIA, which preferably lists the transaction on a daily stored value transaction summary.

Note that unlike other systems such as credit and debit systems, no funds transfer takes place in a stored value transaction. This is because the payee already has received the funds from the payor, and is simply accounting for their use when products are purchased using the biometric stored value transaction.

In another embodiment, the EM stores and manages the current account balance of payees. In this embodiment, the EM determines if a particular stored value payment can be made, and debits the payor's account.

In one embodiment, the DPC contains only one payee. In this case, the payee does not need to be identified by the DPC during the transaction, nor does the payee need to be registered with the DPC.

Each transaction (successful or not) is logged in the logging facility (LF) 36.

Logging Facility

In a preferred embodiment, the logging facility (LF) 36 logs all stored value payment attempts to write-once media, so that a record is kept of each transaction and each error that has occurred during the operation of the tokenless authorization system.

Use-Sensitive DPC Configuration

While each DPC has some or all of the above features, in some embodiments the system has use-sensitive data processing capabilities, wherein multiple DPCs exist, some of which store a subset of the total number of registered parties.

This system comprises at least one master DPC, which contains a large subset of all parties registered with the system. The system further comprises at least two local DPCs that are physically apart from each other. Each local DPC contains a subset of the parties contained within the master DPC. Data communications lines allow messages to flow between each local DPC and the master DPC.

In this embodiment, identification request messages are first sent to the local DPC for processing. If a party cannot be identified by the local DPC, the message is forwarded to the master DPC. If the parties are identified properly by the master DPC, the message is processed appropriately. In addition, one or both party's identity information is transmitted from the master DPC to the local DPC, so that the next time parties will be successfully identified by the local DPC.

In another embodiment of a use-sensitive DPC system, the system further comprises a purge engine for deleting a party's identification information from the local DPC databases. In order to store only records for those parties who use the system more than a prescribed frequency and prevent the overload of databases with records from parties who use the system only occasionally, the record of a party is deleted from the local DPC databases if there has been no attempt to identify the party upon expiration of a predetermined time limit.

In order to make communications between the master DPC and the local DPCs secure, the system further comprises encryption and decryption means, wherein communications between the master DPC and local DPC are encrypted.

Registration

Parties that wish to either originate or receive stored value payments must first register with the tokenless authorization system. The information registered with the system for a given party depends on the mode used to originate or receive payment. A payor must register at least one biometric or a biometric-PIN, as well as deposit and maintain a cash balance, and select the payee with which this account is associated. The payee must register at least one digital certificate, or must register their PIA hardware identification codes.

To register, a payor submits a registration biometric sample obtained from their physical person by the PIA's biometric sensor. The PIA determines that the biometric scan is non-fraudulent, and then translates and compresses that biometric scan into a format suitable for rapid transmission to the DPC. The payor then enters a PIN code into the PIA keypad.

Next, the payor deposits an amount of cash into their stored value account. Lastly, the payor indicates the payee that this particular stored value account will be automatically associated with.

The PIA then transmits the registration data and the balance amount to the DPC. The DPC then inserts the biometric (or biometric-PIN) into the appropriate identification database and enables the payor to originate stored value payments to a particular payee.

A payee may either register at least one digital certificate, or use at least one PIA hardware identification code to identify itself to the DPC. Digital certificates are available from certifying authorities, and they provide the assurance that the entity with the certificate is the authentic owner of that identity. These certificates contain readable text and other information that describes the entity. This can include a corporate logo, the address, as well as the company name.

PIA hardware identification codes are unique numbers assigned to PIA devices at the time of manufacture. A payee installing PIA devices at the point of sale can register PIAs with the DPC. This causes any transactions (either registration or purchase) flowing through those PIAs to automatically identify the payee using the hardware identification code.

Preferably, the security surrounding the registration of digital certificates or PIA hardware identification codes to financial account numbers is extremely strong, as this is a potential source for large losses over a short period of time.

In a preferred embodiment, a payor deposits funds into an existing payor account, increasing the stored value available for use in stored value transactions.

Transactions

Transactions optionally occur at a retail point of sale, across the network from a well-known network merchant, or at home or public terminal.

Retail Point of Sale Transactions

Figure 6:
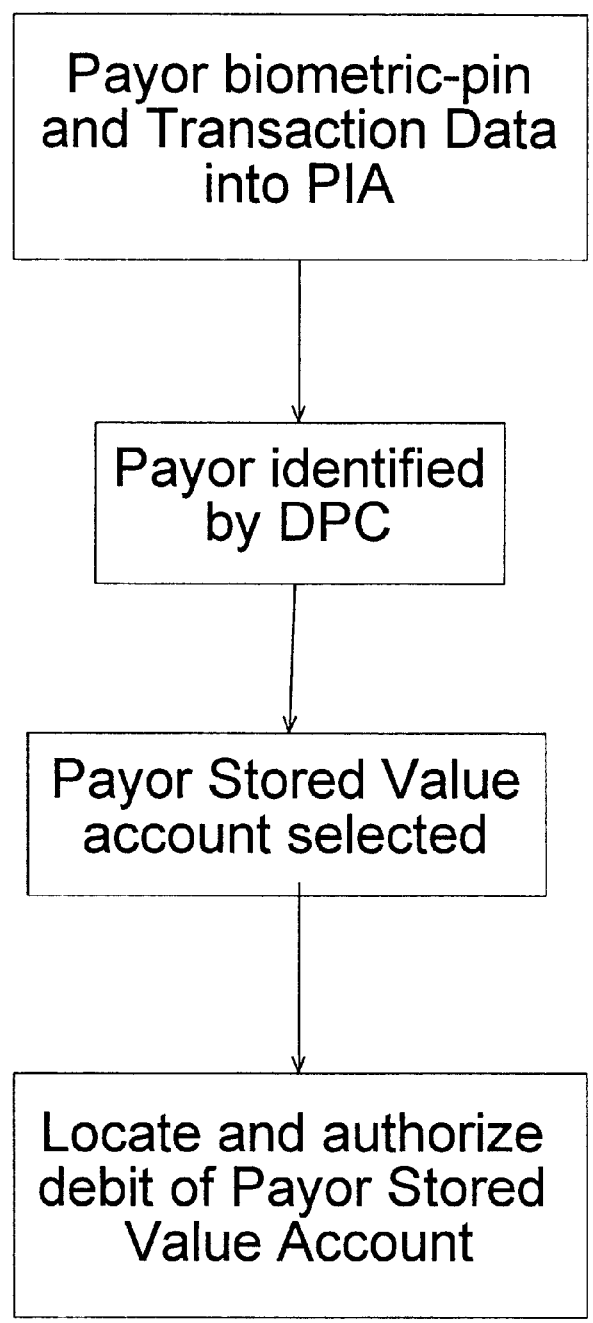
FIG. 6 shows the overall preferred flow chart where a biometric sample and PIN are used by the tokenless system to authorize a debit of the payor stored value account.

Retail point of sale transactions as shown in FIGS. 6 and 7 are characterized by identifying the payor using their biometric sample or biometric sample-PIN on a PIA controlled by payee. The payor is thus identified through biometrics, while the payee is identified through the PIA's hardware identification code.

In a preferred embodiment, a payor at the point of sale authorizes an electronic stored value payment to a payee in the following manner. First, the payor submits a bid biometric sample obtained from their physical person by the PIA's biometric sensor. The PIA determines that the biometric sample is non-fraudulent, and then translates and compresses that biometric sample into a format suitable for rapid transmission to the DPC.

Next, the payor enters a PIN code into the PIA keypad. At this point, the PIA transmits the biometric-PIN to the DPC for identification, along with the PIA hardware identification code. The DPC identifies the payee using the PIA hardware identification code that was previously registered by the payee. The DPC identifies the payor using the biometric sample, and identifies the stored value account of the payor using the identity of the payee.

The transaction amount is then entered into the PIA, either using an electronic cash register or manually, by the payee. The payor then either approves or cancels the transaction using the PIA's keypad. Once the stored value payment is approved, the PIA transmits the stored value transaction to the DPC, which the DPC then forwards to the payee.

Execution of the transaction may result in a declined transaction due to lack of funds or other problem condition reported by the payee. If the transaction is declined, the DPC transmits the decline notification back to the PIA, canceling the transaction.

Network Point of Sale Transactions

Network point of sale transactions are characterized by identifying the payor using the payor's bid biometric sample submitted through the payor's personal PIA, or through a public PIA attached to an ATM or other public terminal. The payee is a registered network merchant, and is identified through a digital certificate. Thus the payor is identified through biometrics, while the payee is identified through the verification of a digital certificate issued by an authorized certifying authority.

In a preferred embodiment, the payor first locates the payee by locating the payee's place of business on the network: the web site, using the network address of the payee. The payor downloads the payee's digital certificate to the PIA that the payor is using. The PIA verifies that the digital certificate provided by the payee is a valid certificate.

The payor then submits a bid biometric sample obtained from their physical person using the PIA's biometric sensor. The PIA determines that the biometric scan is non-fraudulent, and then translates and compresses that biometric scan into a format suitable for rapid transmission to the DPC. The payor then enters a PIN code into the PIA keypad.

The PIA transmits the biometric-PIN to the DPC for identification, along with the payee's digital certificate. The payor's stored value account is automatically selected by the DPC using the payee's identity.

The payee also transmits the proposed transaction amount to the PIA. The payor then either approves or cancels the transaction using the PIA's keypad. Once the transaction is approved, the PIA transmits the stored value payment to the DPC, where the DPC authorizes the stored value payment and transmits the stored value transaction to the payee.

Execution by the DPC may result in a declined transaction due to lack of funds in the account, a closed account, or some other immediately detectable problem condition. If the transaction is declined, the DPC transmits the decline notification back to the PIA, and the transaction is cancelled.

Alternate Embodiments

In one embodiment, the PIA is actually built-in and/or integrated with a personal computer. These personal computer PIA hardware identification codes are not used to identify either party in a transaction.

In another embodiment, the payor can be a representative of a business entity that has permission to access the business entity's stored value accounts to purchase items on the network.

In yet another embodiment, debiting of the stored value account is delayed for an agreed-upon time period, to enable implementation of net-30 payment terms and the like.

In one embodiment, a stored value transaction is debited from the payor but credited to an escrow account at the payee, to be released under certain conditions such as product shipment or payor receipt of merchandise.

In one embodiment, a private code, which is distinct from a personal identification number (PIN) and not used in a payor identification step, is transmitted to the PIA from the transaction processors of the DPC, and presented to the payor subsequent to a successful identification using biometrics. This private code identifies the electronic identicator to the payor. The private code is preferably selected by the payor during registration with the electronic identicator, and is never entered into the PIA during a transaction authorization. Additionally, the PIA and DPC always transmit the private code in an encrypted form. As a result, only the authentic DPC and PIA can provide a person's private code after a successful identification.

The authorization system alternatively further comprises a tokenless authorization system that communicates with one or more external computers during the payor resource determination step and the transaction payment step.

In one embodiment, the transaction amount includes data that is necessary for conducting a transaction such as price information, a list of goods and services, a payee name, a date or time, a location, or an invoice number.

The transaction acceptance step optionally further comprises the payor entering a new transaction amount, which is the sum of a cash back amount and the transaction amount, for the financial transaction.

Preferably, in a payor re-registration step, the user's registration biometric samples are compared against previously designated biometric samples wherein if a match occurs, the computer system is alerted to the fact that the payor has re-registered with the tokenless authorization system.

Also preferably, in a biometric theft resolution step, where the payor uses a Biometric-PIN identification subsystem, the payor's personal identification number is changed whenever the payor's biometric sample is determined to have been fraudulently duplicated.

In one embodiment, the PIA is actually built-in and/or integrated with a personal computer. These personal computer PIA hardware identification codes are not used to identify either party in a transaction. In another embodiment, the payor can be a representative of a business entity that has permission to access the business entity's accounts to purchase items on the network.

From the foregoing, it will be appreciated how the objectives and features of the invention are met. First, the invention provides a stored value payment computer system that eliminates the need for a payor to possess and present any man-made tokens, in order to authorize a transaction.

Second, the invention provides a stored value payment computer system that is capable of verifying a payor's unique personal identity, as opposed to verifying possession of objects and information.

Third, the invention verifies the payor's identity based upon one or more unique characteristics physically personal to the user.

Fourth, the invention provides a cost-effective stored value payment system that is practical, convenient, and easy use.

Fifth, the invention provides a system of secured access to a computer system that is highly resistant to fraudulent transaction authorization attempts by unauthorized users.

Sixth, the invention provides a stored value payment authorization system that enables a payor to notify authorities that a particular access request is being coerced by a third party without giving notice to the third party of the notification.

Although the invention has been described with respect to a particular tokenless authorization system and method for its use, it will be appreciated that various modifications of the apparatus and method are possible without departing from the invention, which is defined by the claims set forth below.

What is claimed is:

1. A method for tokenless biometric authorization of a stored value transaction between a payor and a payee using an electronic identicator and at least one payor bid biometric sample, said method comprising the steps of:
  a. a payor registration step, wherein the payor registers with the electronic identicator at least one registration biometric sample, and at least one payor stored value account;
  b. a payee registration step, wherein the payee registers payee identification data with the electronic identicator;

c. a transaction formation step, wherein an electronic financial transaction is formed between the payor and the payee, comprising payee bid identification data, a transaction amount, and at least one payor bid biometric sample, wherein the bid biometric sample is obtained from the payor's person;

d. at least one transmission step, wherein the payee bid identification data, the transaction amount, and payor bid biometric sample are electronically forwarded to the electronic identicator;

e. a payor identification step, wherein the electronic identicator compares the bid biometric sample with at least one registered biometric sample for producing either a successful or failed identification of the payor;

f. a payee identification step, wherein the electronic identicator compares the payee's bid identification data with a payee's registered identification data for producing either a successful or failed identification of the payee;

g. wherein upon successful identification of the payor and payee, a stored value transaction is authorized without the payor presenting a stored value card, smartcard, or magnetic swipe card to debit the payor stored value account.

2. The method of claim 1 wherein the payee identification data comprises any one of the following; a payee hardware ID code, a payee telephone number, a payee email address, a payee digital certificate code, a payee account index, a payee financial account number, a payee biometric, and a payee biometric and PIN combination.

3. The method of claim 1 further comprising a payor deposit step, wherein the payor deposits cash into the payor stored value account, and the payor stored value account is credited by the amount of the deposit.

4. The method of claim 1 wherein the payor registration step further comprises registering a payor personal identification number with the electronic identicator, which is used by the tokenless authorization system to identify the payor.

5. The method of claim 1 further comprising a payor resource determination step, wherein it is determined if the payor's stored value account has sufficient resources to be debited for the transaction amount.

6. The method of claim 1 further comprising a transaction payment step, wherein the transaction amount is debited from a payor's stored value account.

7. The method of claim 1 wherein the registration step further comprises registering a payor private code with the electronic identicator, which is distinct from a personal identification number and not used in the payor identification step, wherein the private code is displayed to the payor to validate that the authentic electronic identicator has processes the stored value transaction.

8. The method of claim 6 wherein both the payor resource determination step and the transaction payment step further comprise the tokenless authorization system communicating with one or more external computers.

9. The method of claim 1 wherein the transaction amount comprises price information, a list of goods and services, a payee name, a date or time, a location, or an invoice number.

10. The method of claim 1 wherein the transaction acceptance step further comprises the payor entering a new transaction amount, which is the sum of a cash back amount and the transaction amount, for the stored value transaction.

11. The method of claim 6 wherein the transaction payment step further comprises the payor designating a future date on which the transaction amount is to be deducted from the payor's stored value account.

12. The method of claim 4 further comprising a biometric theft resolution step, wherein the payor's personal identification number is changed whenever the payor's biometric sample is determined to have been fraudulently duplicated.

13. A tokenless stored value transaction authorization device using biometrics for debiting funds from a payor stored value account, said device comprising:

a. a computer data processing center further comprising data bases wherein the payor registers a registration biometric sample and the payee registers a payee identification data;

b. a party identification apparatus having a biometric sensor for input of a biometric sample;

c. communication lines for transmission of a registration and bid biometric sample obtained by the party identification apparatus from the payor's person to the data processing center;

d. a comparator engine for comparing a bid biometric sample to at least one registration biometric sample, and comparing a bid payee identification data with at least one registration payee identification data; and e. an execution module for authorizing debit of a transaction amount from the payor stored value account upon successful identification of the payor, wherein no stored value card, smartcard, or magnetic swipe card is used by the payor to authorize the debit of the stored value account.

14. The authorization device of claim 13 wherein the payee identification data comprises any one of the following; a payee hardware ID code, a payee telephone number, a payee email address, a payee digital certificate code, a payee account index.

15. The authorization device of claim 13 wherein the payor registration biometric sample is associated with a PIN, the PIN used by the authorization device for identification the payor.

16. The authorization device of claim 13 wherein the execution module determines if the payor's stored value account has sufficient resources to be debited for the transaction amount.

17. The authorization device of claim 13 wherein the execution module debits the transaction amount from the payor stored value account.

18. The authorization device of claim 13 further comprising transaction processors wherein the payor registers a private code with the authorization device, which is distinct from a personal identification number and not used to identify the payor, wherein the private code is displayed to the payor to validate that the authentic authorization device has processed the financial transaction.

19. The device of claim 13 further comprising a biometric theft resolution means, wherein the payor's personal identification number is changed whenever the payor's biometric sample is determined to have been fraudulently duplicated.

* * * * *

UNITED STATES PATENT AND TRADEMARK OFFICE
CERTIFICATE OF CORRECTION

PATENT NO. : 6,192,142 B1
DATED : February 20, 2001
INVENTOR(S) : Pare Jr. et al.

Page 1 of 1

It is certified that error appears in the above-identified patent and that said Letters Patent is hereby corrected as shown below:

*Attorney, Agent or Firm,* "Marger Johnson & McCollom, P.C." should read -- Ali Kamarei, Esq. --

Signed and Sealed this

Fourth Day of December, 2001

*Attest:*

Nicholas P. Godici

*Attesting Officer*

NICHOLAS P. GODICI
*Acting Director of the United States Patent and Trademark Office*